(12) United States Patent
Maeda

(10) Patent No.: US 9,310,225 B2
(45) Date of Patent: Apr. 12, 2016

(54) SCALE FOR PHOTOELECTRIC ENCODER

(71) Applicant: MITUTOYO CORPORATION, Kanagawa (JP)

(72) Inventor: Fujio Maeda, Yokohama (JP)

(73) Assignee: MITUTOYO CORPORATION, Kanagawa (JP)

( * ) Notice: Subject to any disclaimer, the term of this patent is extended or adjusted under 35 U.S.C. 154(b) by 62 days.

(21) Appl. No.: 14/284,902

(22) Filed: May 22, 2014

(65) Prior Publication Data

US 2014/0367560 A1 Dec. 18, 2014

(30) Foreign Application Priority Data

Jun. 14, 2013 (JP) ................. 2013-125161

(51) Int. Cl.
G01D 5/34 (2006.01)
G01D 5/347 (2006.01)

(52) U.S. Cl.
CPC ........ *G01D 5/34707* (2013.01); *G01D 5/34746* (2013.01)

(58) Field of Classification Search
CPC G01D 5/347; G01D 5/34707; G01D 5/34746
See application file for complete search history.

(56) References Cited

U.S. PATENT DOCUMENTS

| 3,573,007 A | 3/1971 | Grobitz | |
|---|---|---|---|
| 5,796,068 A * | 8/1998 | Jones | B23K 26/285 219/121.63 |
| 5,796,098 A * | 8/1998 | Azzam | G01D 5/344 250/214.1 |
| 6,001,467 A * | 12/1999 | Ohta | G11B 11/10584 360/131 |
| 7,916,045 B2 | 3/2011 | Tominaga et al. | |
| 8,546,747 B2 * | 10/2013 | Nagura | G01D 5/3473 250/231.14 |
| 8,816,269 B2 * | 8/2014 | Mizuno | G01D 5/34707 250/231.13 |
| 2006/0270226 A1 * | 11/2006 | Hosoya | B82Y 10/00 438/686 |
| 2009/0290469 A1 * | 11/2009 | Watanabe | C09B 23/04 369/100 |
| 2010/0270461 A1 | 10/2010 | Tominaga | |

FOREIGN PATENT DOCUMENTS

| EP | 2112477 A2 | 10/2009 |
|---|---|---|
| GB | 2072850 A | 10/1981 |
| JP | 2009-264923 A | 11/2009 |
| WO | 2007/044798 A2 | 4/2007 |

OTHER PUBLICATIONS

Search report from E.P.O., mail date is Nov. 3, 2014.
Office Action issued in E.P.O. Family Member Patent Appl. No. 14001908.4, dated Sep. 3, 2015.

* cited by examiner

*Primary Examiner* — Tony Ko
(74) *Attorney, Agent, or Firm* — Greenblum & Bernstein, P.L.C.

(57) ABSTRACT

A scale for a photoelectric encoder includes a scale substrate and a reflection film formed at a predetermined pitch on the scale substrate. A surface of the reflection film forms a reflection surface. A low-reflection surface is formed by etching the scale substrate between reflection films. Accordingly, a scale can be provided which is lower in cost and has favorable yield rates.

6 Claims, 5 Drawing Sheets

PRIOR ART

PRIOR ART

SCALE FOR PHOTOELECTRIC ENCODER

CROSS-REFERENCE TO RELATED APPLICATIONS

The present application claims priority under 35 U.S.C. §119 of Japanese Application No. 2013-125161, filed on Jun. 14, 2013, the disclosure of which is expressly incorporated by reference herein in its entirety.

BACKGROUND OF THE INVENTION

1. Field of the Invention

The present invention relates to a scale for a photoelectric encoder, an encoder, and a method of forming a scale.

2. Description of Related Art

Several methods are known of forming a scale for a photoelectric encoder. One of the methods of forming the scale is a method of etching SUS (Special Use Stainless Steel), which serves as a substrate of the scale (a scale having a structure formed with this method is referred to hereafter as an etched scale structure).

FIG. 6 illustrates a partial cross-sectional view of a scale 100 having the etched scale structure. In order to facilitate understanding, cross-hatching of the substrate is omitted in the cross-sectional view. In the etched scale structure, a required contrast for the scale is obtained by a polished surface 102 of an SUS substrate 101 serving as a reflection surface and an etched surface 103, which is a portion where the SUS has been etched, serving as a low-reflection surface.

In addition, Japanese Patent Laid-open Publication No. 2009-264923 includes a method of forming a scale in which a film of a material different from that of the substrate is formed on a surface of the substrate. FIG. 7 illustrates a partial cross-sectional view of a scale 200 in which a light reflection layer is formed by Cr on a DLC film. The scale 200 includes a light absorption layer formed by a DLC (Diamond-like Carbon) layer 202 on a surface of an SUS substrate 201, and a light reflection layer 203 formed by Cr on a DLC layer and having a reflectance higher than that of the DLC layer.

The etched scale structure can be fondled at a low cost; however, an etching resist (photoresist) forming graduated marks on the SUS surface, i.e., used in a lithography technique, has poor adhesion to SUS and quality of the graduated marks is difficult to maintain.

FIG. 8 illustrates a partially expanded view of the scale having the etched scale structure. As shown in FIG. 8, in the etched scale structure, so-called undercutting may occur during etching and the quality of the graduated marks varies strikingly by location. Thus, particularly when used on a long article, the etched scale structure has been limited, such as having an accommodatable length of the scale become shorter and having low yield rates.

In addition, in the technology disclosed in Japanese Patent Laid-open Publication No. 2009-264923, a DLC film must be deposited on the surface of the substrate of the scale, which may become expensive.

SUMMARY OF THE DISCLOSURE

The present disclosure resolves the above-noted concerns and provides a scale for a photoelectric encoder, an encoder, and method of forming a scale, which are lower in cost and have favorable yield rates.

A scale for a photoelectric encoder according to the present disclosure includes a scale substrate and a reflection film formed at a predetermined pitch on the scale substrate. A surface of the reflection film forms a reflection surface. A low-reflection surface is formed by etching the scale substrate between reflection films. Accordingly, graduated marks of the scale can be formed more uniformly.

An encoder according to the present disclosure includes a scale substrate; a scale arranged on the scale substrate; and a reader reading the scale. The scale includes a low-reflection surface and a light reflection surface, the low-reflection surface having the substrate etched at a predetermined pitch in an orthogonal direction on top of the scale substrate, and the light reflection surface having a reflection film with a higher reflectance than the low-reflection surface formed in a region between where the low-reflection surfaces are formed and following a direction orthogonal to a measurement direction of the scale. Accordingly, accuracy of the encoder can be further improved.

A method of forming a scale according to the present disclosure is a method of forming a scale having a low-reflection surface and a light reflection surface. A reflection film having favorable adhesion with a scale substrate and a higher reflectance than the low-reflection surface is formed on a polished surface of a substrate; a portion of the reflection film is etched at fixed intervals and in a direction orthogonal with respect to a measurement direction of the scale to form the light reflection surface; and the reflection film is etched, then a region where a polished surface of the substrate is exposed is further etched to form the low-reflection surface. Accordingly, a scale can be formed that has more uniform graduated marks.

The present disclosure provides a scale for a photoelectric encoder, an encoder, and a method of forming a scale, which are capable of being configured readily and at a lower cost.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
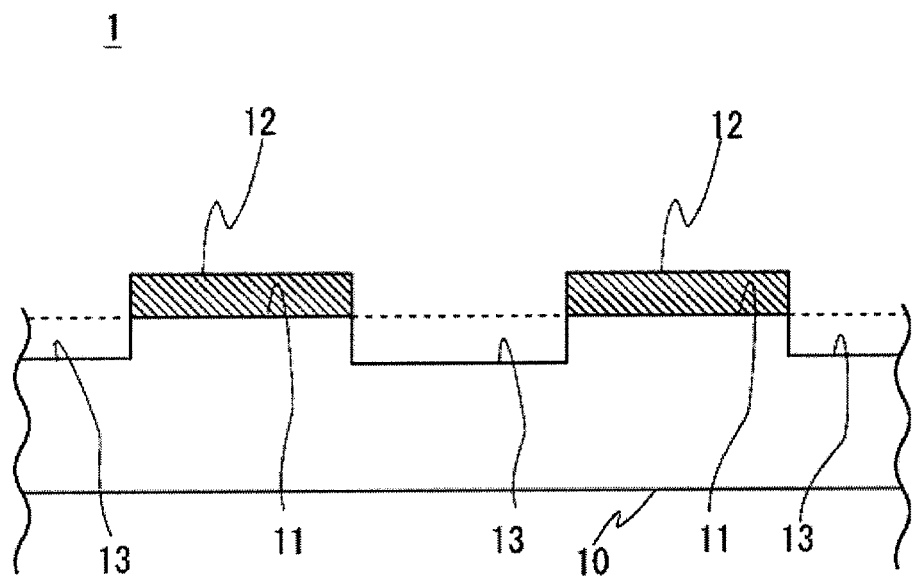
FIG. 1 illustrates a partial cross-sectional view of a scale according to an embodiment of the present disclosure.
Figure 2:
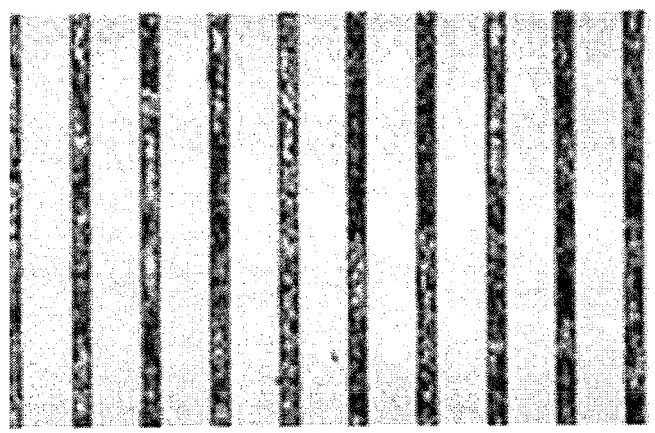
FIG. 2 is an expanded view of a portion of the scale according to the embodiment.
Figure 3A:
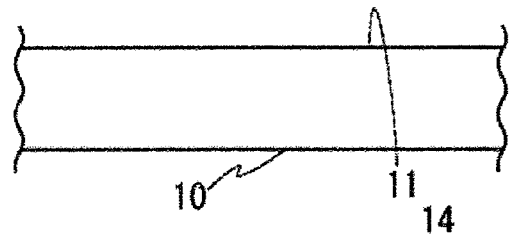
FIGS. 3(a) to 3(f) illustrate a method of forming a scale according to the embodiment.
Figure 3B:
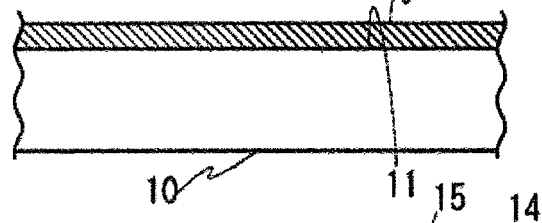
Figure 3C:
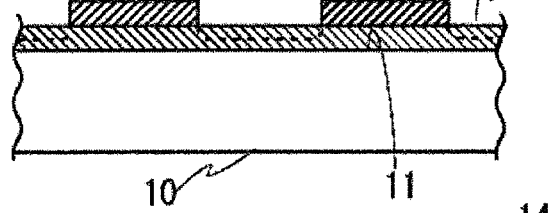
Figure 3D:
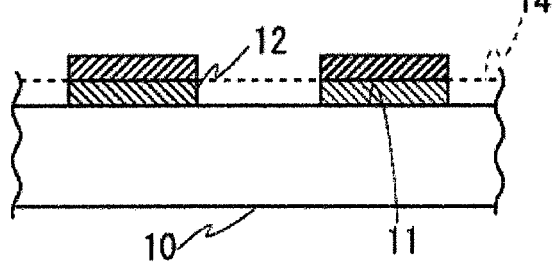
Figure 3E:
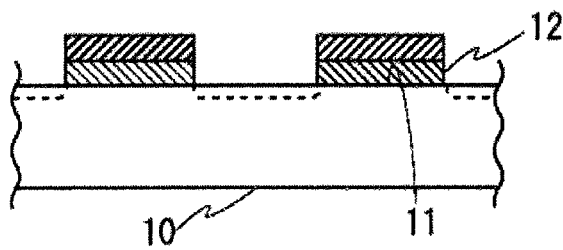
Figure 3F:
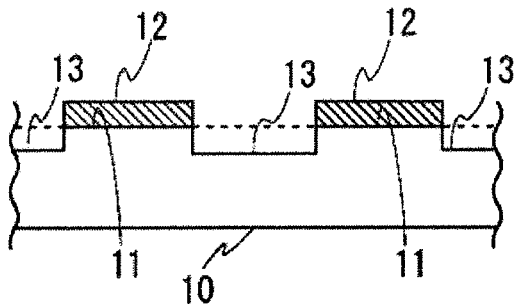

Hereafter, an embodiment of the present disclosure is described with reference to the drawings. FIG. 1 illustrates a partial cross-sectional view of a scale according to an embodiment of the present disclosure. FIG. 2 is an expanded view of a portion of a scale 1. The scale 1 includes a light reflection surface 12 formed by a Cr film on a polished surface 11 of an SUS substrate 10, and a low-reflection surface 13 formed by an etched SUS surface. The light reflection surface 12 and the low-reflection surface 13 are arranged so as to alternate in a measurement direction of the scale, and are formed at fixed intervals along a direction orthogonal to the measurement direction of the scale.

Next, a description is given of a method of forming the scale 1 according to the present embodiment. FIGS. 3(a) to 3(f) illustrate a method of manufacturing the scale 1. First, a surface of the SUS substrate 10 is polished to create the polished surface 11 (FIG. 3(a)). Next, a Cr film 14 is formed on the surface of the SUS substrate 10 (FIG. 3(b)).

In addition, in order to etch the Cr film 14, a resist 15 is formed on a top surface of the Cr film 14. The Cr film 14 is first etched (FIG. 3(c)) and the light reflection surface 12 is formed. When the reflection surface 12 has been formed (FIG. 3(d)), an etching liquid is changed and the SUS substrate 10 is etched (FIG. 3(e)), forming the low-reflection surface. Lastly, the resist 15 is removed (FIG. 3(f)).

In the present embodiment, the Cr film 14 is deposited on the SUS polished surface 11 and the resist is formed on the Cr film 14. Cr has favorable adhesion with the resist, and thus by using the resist to etch the Cr, undercutting of the Cr can be reduced. In addition, Cr has favorable adhesion with SUS, and thus by creating a mask with a pattern of Cr, undercutting that occurs when etching SUS can be reduced. Accordingly, quality of graduated marks on the scale 1 according to the present embodiment can be improved/stabilized as compared to a case where the SUS substrate is etched by the resist, to which the SUS substrate has poor adhesion. As a result, the method can be applied to a long scale.

In addition, with the scale 1 according to the present embodiment, the scale can be formed without forming the DLC layer. This enables manufacture at a lower cost.

Figure 4:
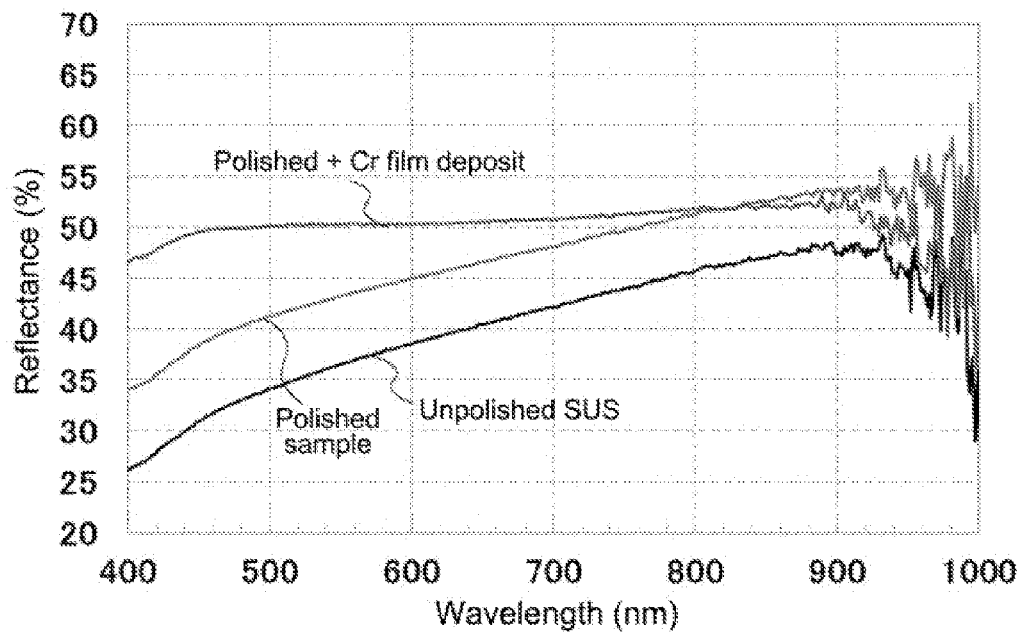
FIG. 4 is a graph illustrating spectral reflectance.

In addition, as compared to SUS, spectral reflectance of the Cr film is unlikely to change in response to a change in wavelength. FIG. 4 is a graph illustrating the spectral reflectance of unpolished SUS, polished SUS, and a sample in which the Cr film is formed on an SUS polished surface. As shown in FIG. 4, in a case where the Cr film is formed on the SUS polished surface, spectral reflectance becomes flat. Therefore, variation in reflectance in a specific wavelength due to a degree of polishing can be lessened.

Accordingly, a scale can be obtained having higher reflection and increased performance in a wavelength region used comparatively often by a photoelectric encoder, such as in the vicinity of red 650 nm for example, as compared to a case using the SUS polished surface as the light reflection surface.

Moreover, when an encoder is configured that reads the scale using a plurality of wavelengths, such as a configuration using two wavelengths (red and infrared (e.g., 750 nm), for example), positive effects can be obtained, such as properties being readily matched.

Figure 5:
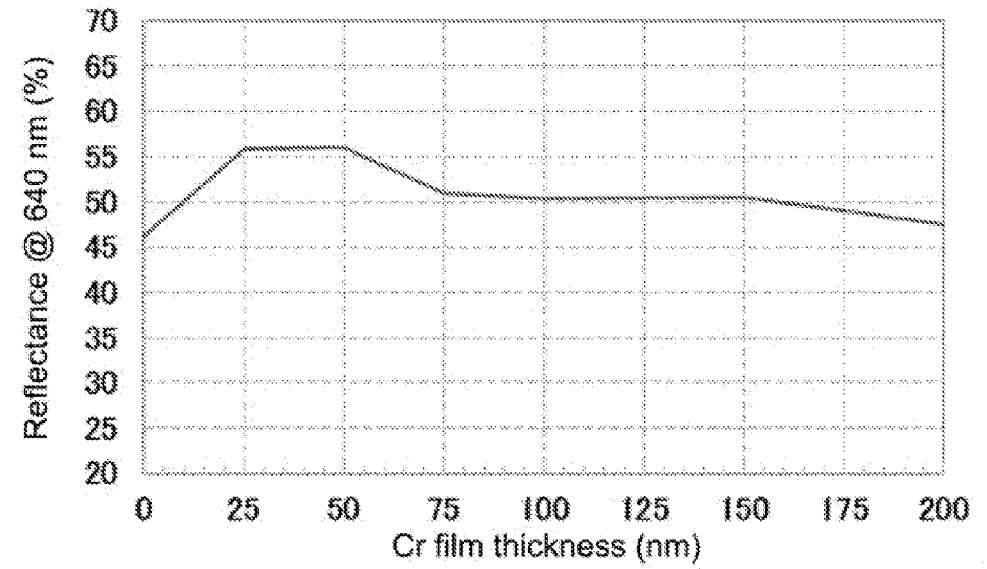
FIG. 5 is a graph illustrating film thickness of a Cr film and reflectance.
Figure 6:
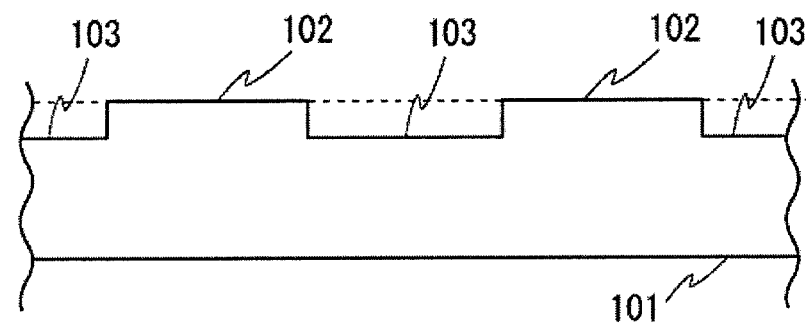
FIG. 6 illustrates a partial cross-sectional view of a scale having a conventional etched scale structure.
Figure 7:
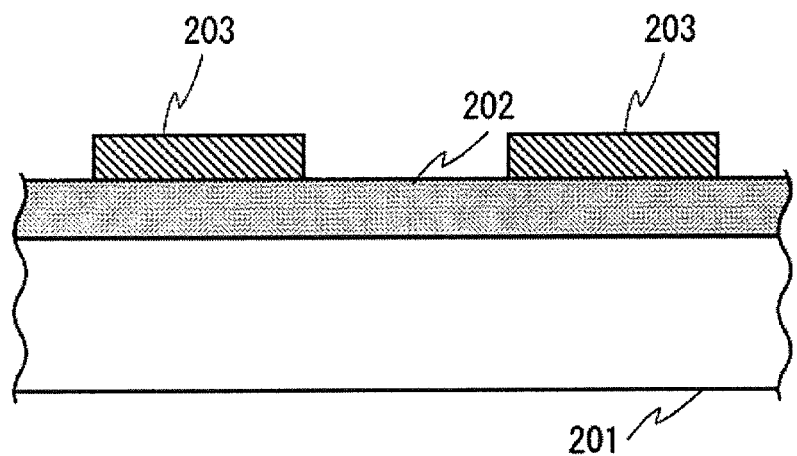
FIG. 7 illustrates a scale in which a light reflection layer is formed by Cr on a conventional DLC film.
Figure 8:
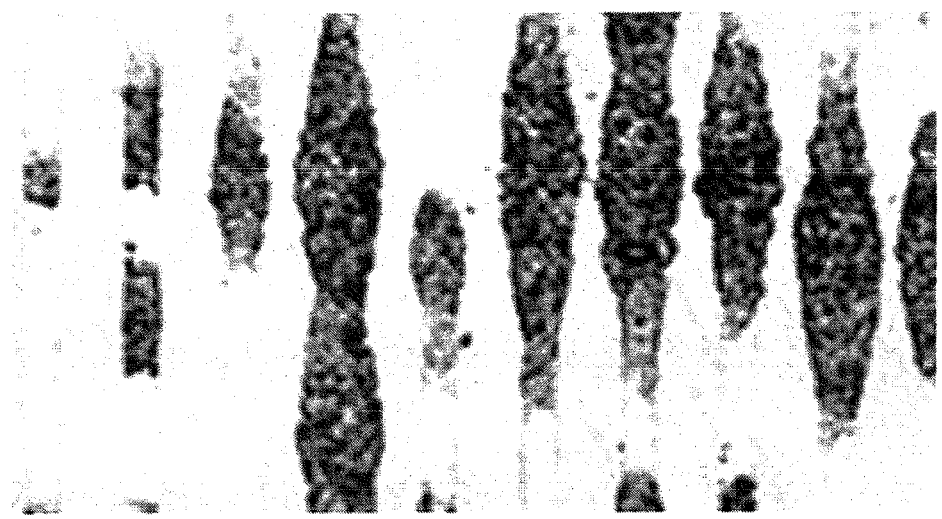
FIG. 8 illustrates a partially expanded view of the scale having the conventional etched scale structure.

Furthermore, in the present embodiment, the thickness of the Cr film 14 is preferably 25 nm to 200 nm. A range of 25 to 50 nm is particularly preferred. FIG. 5 is a graph illustrating a film thickness of the Cr film 14 and reflectance of a 640 nm-wavelength beam. When the Cr film 14 is 25 nm or more and 50 nm or less, reflectance is high because light reflected by the surface of the Cr film 14 and light reflected by a surface portion on a boundary with the polished surface 11 of the SUS substrate 10 reinforce each other. In addition, when the Cr film 14 is thin, etching of the Cr film 14 can be more readily performed.

Moreover, the present invention is not limited to the embodiment described above, and may be modified as needed without departing from the scope of the present invention. For example, a film made of Ni or $TiSi_2$ can be used instead of the Cr film. In addition, iron or Invar material may also be used for the SUS substrate. When formed with iron, a scheme may be devised in which surface processing is performed to prevent rust, or a usage environment is limited.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A scale for a photoelectric encoder comprising:
   a stainless steel scale substrate;
   a plurality of chrome reflection films each having a thickness of 25 nm to 200 nm and located on the substrate at a predetermined pitch, the plurality of reflection films comprising a reflection surface; and
   a low-reflection surface between reflection films of the plurality of reflection films and formed by etching the scale substrate.

2. The scale for the photoelectric encoder according to claim 1, wherein the scale substrate is Special Use Stainless Steel.

3. The scale for the photoelectric encoder according to claim 1, wherein the scale substrate is Invar material.

4. The scale for the photoelectric encoder according to claim 1, wherein the reflection film is adhesive with the scale substrate.

5. An encoder comprising:
   a stainless steel scale substrate;
   a scale arranged on the scale substrate, the scale comprising:
      a low-reflection surface in which the substrate is etched at a predetermined pitch and in an orthogonal direction on top of the scale substrate; and
      a light reflection surface having a chrome reflection film with a higher reflectance than the low-reflection surface formed in a region between where the low-reflection surfaces are formed and following a direction orthogonal to a measurement direction of the scale, the chrome reflection film having a thickness of 25 nm to 200 nm; and
   a reader configured to read the scale.

6. A method of forming a scale having a low-reflection surface and a light reflection surface, the method comprising:
- forming, on a polished surface of a stainless steel substrate, a chrome reflection film adhesive with a scale substrate and a higher reflectance than the low-reflection surface, the reflection film having a thickness of 25 nm to 200 nm;
- etching a portion of the reflection film at fixed intervals and in a direction orthogonal to a measurement direction of the scale to form the light reflection surface; and
- etching the reflection film, then further etching a region where a polished surface of the substrate is exposed to form the low-reflection surface.

* * * * *